(12) United States Patent
Locoge et al.

(10) Patent No.: US 10,508,905 B2
(45) Date of Patent: Dec. 17, 2019

(54) DEVICE AND METHOD FOR MEASURING CAVITIES AND USE OF THE DEVICE FOR DETERMINING ROLLER ALIGNMENTS

(71) Applicant: Prüftechnik Dieter Busch AG, Ismaning (DE)

(72) Inventors: Pascal Locoge, Erding (DE); Edwin Becker, Moosinning (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 15/944,608

(22) Filed: Apr. 3, 2018

(65) Prior Publication Data
US 2018/0283855 A1 Oct. 4, 2018

(30) Foreign Application Priority Data
Apr. 4, 2017 (DE) .......................... 10 2017 107 245

(51) Int. Cl.
*G01B 11/14* (2006.01)
*G01B 11/27* (2006.01)

(52) U.S. Cl.
CPC ............ *G01B 11/272* (2013.01); *G01B 11/14* (2013.01)

(58) Field of Classification Search
CPC ......... G01N 21/954; G01N 2291/0231; G01N 2291/2694; G01N 29/225; G01N 21/8803; G01N 29/043; G01N 29/265; G01N 2291/26; G01N 29/26; G01N 29/28; G01N 15/06; G01N 2015/0011; G01N 2015/0053; G01N 2015/0693; G01N 2021/9542; G01N 21/8507; G01N 21/8806; G01N 2201/062; G01N 2291/106; G01N 2291/2636; G01N 22/02; G01N 2333/4703; G01N 2800/52; G01N 2800/56; G01N 33/2858; G01N 33/2888; G01N 33/574; G02B 3/0018; G02B 3/0056; G02B 23/2469;
(Continued)

(56) References Cited

U.S. PATENT DOCUMENTS 4,298,281 A 11/1981 Schave
4,346,993 A * 8/1982 Trost ...................... G01B 11/26
33/295
(Continued)

FOREIGN PATENT DOCUMENTS

DE 112006003388 B4 12/2010
DE 102014212797 A1 1/2016
(Continued)

*Primary Examiner* — Michael P Stafira
(74) *Attorney, Agent, or Firm* — Barlow, Josephs & Holmes, Ltd.

(57) ABSTRACT

A device for measuring cavities has a main body, at least one first distance sensor mounted on the main body and rotatable about an axis of rotation for contactlessly measuring distances in a radial direction with respect to the axis of rotation, a holder for fixing the device within the cavity in a position in which the main body assumes an orientation in which the axis of rotation of the first distance sensor coincides substantially with a center axis of the cavity, and at least one second distance sensor, arranged on the main body, for contactlessly measuring distances in a direction parallel to the axis of rotation, the axis of rotation passing through a detection area of the second distance sensor.

13 Claims, 2 Drawing Sheets

(58) Field of Classification Search
CPC ...... G02B 13/06; G02B 23/24; G02B 23/243; G02B 23/2484; G02B 23/2492; G02B 23/26; G02B 5/005; G02B 5/0278; G01B 11/2513
See application file for complete search history.

(56) References Cited

U.S. PATENT DOCUMENTS

| | | | |
|---|---|---|---|
| 5,227,864 A | 7/1993 | Yowler | |
| 5,461,793 A * | 10/1995 | Melville | G01B 11/27 33/286 |
| 6,342,946 B1 * | 1/2002 | Holstein | G01B 11/27 33/286 |
| 7,486,390 B2 * | 2/2009 | Suing | G01B 11/272 356/139.1 |
| 7,903,245 B2 * | 3/2011 | Miousset | G01B 11/245 356/241.1 |
| 2004/0114793 A1 * | 6/2004 | Bondurant | G01N 21/954 382/141 |
| 2007/0263202 A1 * | 11/2007 | Ohtomo | G01C 3/08 356/4.01 |
| 2011/0102794 A1 * | 5/2011 | Statham | G01B 11/272 356/400 |
| 2015/0345935 A1 * | 12/2015 | Locoge | G01B 11/12 356/626 |
| 2016/0003608 A1 | 1/2016 | Lenz | |
| 2016/0069820 A1 * | 3/2016 | Bueno | G01N 21/954 356/607 |

FOREIGN PATENT DOCUMENTS

| | | |
|---|---|---|
| EP | 0518572 A2 | 12/1992 |
| JP | S63190909 U | 12/1988 |
| JP | 2002081937 A | 3/2002 |
| JP | 2011133385 A | 7/2011 |
| WO | 2006000552 A1 | 1/2006 |

* cited by examiner

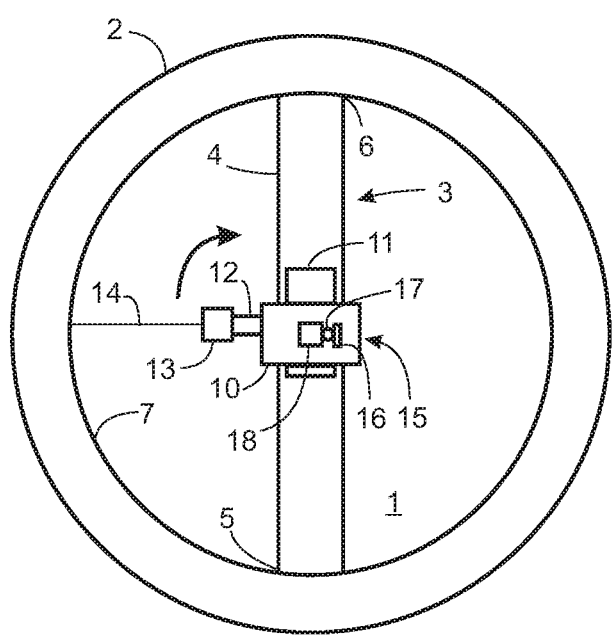
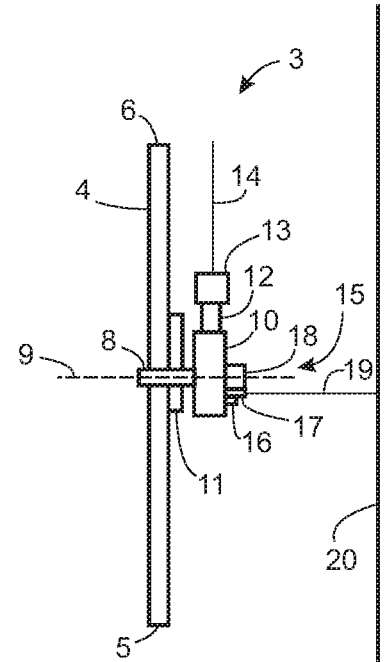
Fig. 1
Fig. 2
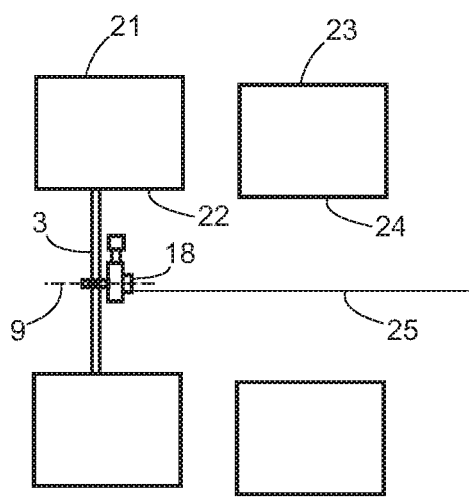
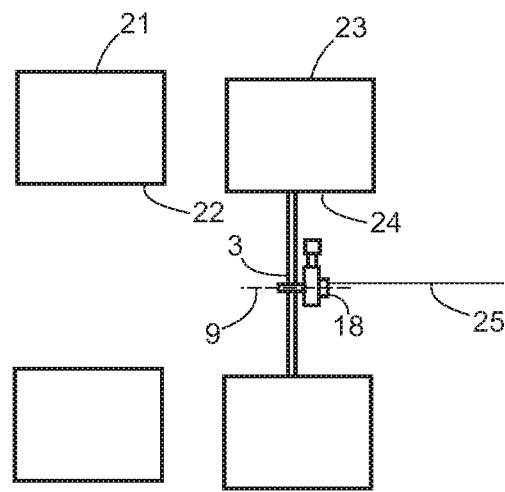
Fig. 3a)
Fig. 3b)

DEVICE AND METHOD FOR MEASURING CAVITIES AND USE OF THE DEVICE FOR DETERMINING ROLLER ALIGNMENTS

BACKGROUND OF THE INVENTION

The present invention relates to a device with a main body, at least one distance sensor mounted on the main body and rotatable about an axis of rotation for contactlessly measuring distances in a radial direction with respect to the axis of rotation, while the axis of rotation of the distance sensor coincides with a center axis of the cavity. The invention also relates to a method for measuring cavities by means of such a device, in which the device is arranged within the cavity in a position in which the main body assumes an orientation in which the axis of rotation of the distance sensor coincides with a center axis of the cavity, the distance sensor is rotated about the axis of rotation and at least one distance from an inner wall of the cavity in a radial direction with respect to the axis of rotation is contactlessly measured with the distance sensor. In addition, the present invention relates to a use of such a device for determining an alignment of at least one first roller, which is mounted rotatably about a first roller axis of rotation, with respect to at least one second roller, which is mounted rotatably about a second roller axis of rotation parallel to the first roller axis of rotation.

A self-propelled device for measuring cavities, and in particular for measuring inside diameters of a shaft bore, is known for example from DE 11 2006 003 388 B4. The device has a laser probe, which is arranged rotatably about a center axis of the shaft bore on a measuring carriage that can propel itself in the axial direction of the shaft bore. The distance by which the measuring carriage advances can be determined by means of a laser distance measuring instrument arranged outside the shaft bore.

By contrast, JP 2011-133385 A shows a device for measuring inside diameters with a first laser probe for measuring radial distances and a second laser probe for measuring axial distances. In this case, the device is intended for being arranged off-center within a cavity to be measured.

SUMMARY OF THE INVENTION

The object of the present invention is to provide a versatile device and a method with which cavities can be measured particularly quickly and easily, and also a further use for such a device.

This object is achieved by the device, the method, and by the use of the present invention. Preferred exemplary embodiments are discussed in detail herein.

According to the present invention, apart from the first distance sensor for measuring radial distances, a second distance sensor for measuring distances in a direction parallel to the axis of rotation, for example a distance from a reference point, reference object, reference body, reference place or a reference location, is additionally arranged on the main body, the axis of rotation passing through a detection area of the second distance sensor. Preferably, the detection area is flat and the axis of rotation is oriented normal or perpendicular to the detection area. After fixing the device in the cavity, which is in particular circular or is a cavity with a circular cross section, the axis of rotation of the first distance sensor coincides substantially with the center axis of the cavity, so that consequently this center axis also passes through the detection area and the second distance sensor measures distances in a direction parallel to the axis of rotation or center axis of the cavity or axial distances from the respective reference object. In this case, the reference object may be located anywhere outside the cavity. For example, simply any wall may be intended as the reference object.

Since both the first distance sensor and the second distance sensor are arranged on the same main body, the device according to the invention is on the one hand compactly designed and can be handled very quickly, easily and conveniently in comparison with known devices, which each require separate or external distance measuring devices that can be arranged and adjusted independently for measuring axial distances. Moreover, axial distances along the center axis of the cavity can be measured more accurately than is possible with separate or external distance measuring devices for measuring axial distances, since the second distance sensor does not first have to be laboriously, and therefore unreliably, aligned or adjusted, whereby potential sources of measuring errors are eliminated.

With the present invention, cavities can be measured for determining their form, or deviations from a prescribed form, or for determining a center or the middle of the cavity or a center or the middle of a cross section of the cavity. In particular, cavities with large diameters, for which distances of over 500 mm can be measured, can be measured with great accuracy by the device according to the invention and the method according to the invention.

The first distance sensor may be attached to the main body, which may for example be a housing, in such a way that, when the first distance sensor rotates, the main body together with the second distance sensor, likewise arranged on the main body, rotates about the same axis of rotation. Also possible however are rotatable mountings of the first distance sensor on the main body, in the case of which the second distance sensor does not rotate together with the first distance sensor when it rotates but remains immovable. In this case, the rotation of the first distance sensor can be performed in a manual or automatic way.

For the evaluation of measured values that are generated, the device may be provided with a corresponding processor. Furthermore, the device may have a memory for storing the measured values or an interface for the cable-bound or wireless transmission of the measured values to another device.

The first distance sensor is advantageously rotatable by a full circle, in order to be able to measure an inner wall of the cavity around the full circumference. The first distance sensor is in this case preferably rotatable by a full circle, the radius of which is also variably adjustable. For this, there may be provided, for example, an arm that is adjustable or variable in length or can be extended and retracted, at the end of which the first distance sensor is arranged. Depending on the type of the first distance sensor and the distance from the inner wall of the cavity to be measured by it or the size of the cavity, in the case of this embodiment the radius of the circle by which the first distance sensor rotates can be set by correspondingly adjusting the length of the rotating arm.

In principle, any distance sensors or distance gauges for contactlessly measuring distances are suitable for the device according to the invention. Thus, both distance sensors or distance gauges may be capacitive sensors, eddy-current sensors and sensors that are based on the confocal triangulation principle. For reasons of simplicity, however, laser sensors with at least one laser source for emitting a laser beam and at least one detection area for detecting reflected laser beams are preferred as the first distance sensor and/or the second distance sensor. In the case of the second distance sensor, the detection area is the already mentioned detection area that is passed through by the axis of rotation. The detection area may be for example the area of a light-sensitive sensor, such as a photovoltaic cell, a PSD sensor or a CCD sensor. In this case, the laser sensors may operate for example on the laser triangulation principle or on the transit-time principle. The transit-time principle is suitable in particular in the case of large diameters of over 1 m, as often occur in the case of generators, since there the measured parts are often colored, and as a result there are comparatively great tolerances.

Particularly preferably, both the first distance sensor and the second distance sensor is a laser sensor, the detection area of the second distance sensor being larger than that of the first distance sensor. A comparatively large detection area of the second distance sensor is especially advantageous whenever two or more cavities that are substantially in line, the center axes of which are however not exactly in line or aligned with one another but are slightly displaced with respect to one another, are measured by means of the same device. Even in such cases, there is no disadvantageous impairment of the measurement, since it is ensured by the large detection area of the second distance sensor that a laser beam emitted and reflected by the second distance sensor can impinge on the detection area of the second distance sensor.

In the case of a preferred embodiment of the device, the holder has an elongated form with two opposite ends, which are both intended to bear against an inner wall of the cavity. In other words, the holder extends transversely through the cavity and bears with its opposite ends against the inner space at locations thereof lying diametrically opposite one another. Such a holder, which may be for example a spreading holder or a clamp, is distinguished by a lightweight and robust type of construction. The holder may in this case be of any size and form, depending on the respective specific application, without any great requirements for accuracy.

A further preferred embodiment of the device according to the invention has at least one inclinometer and/or at least one gyroscope. By means of an inclinometer, the inclination of the device, and consequently the inclination of the cavity in which the device is arranged, can be measured. By contrast, gyroscopes serve for determining the spatial position. Information or data on the inclination or the spatial position of cavities may be required for example for determining the spatial alignment of two or more cavities. Gyroscopes allow and simplify in particular the measurement of vertically oriented cavities, the center axis of which is oriented perpendicularly or vertically.

In principle, the first distance sensor may be set up for performing discrete or point-by-point measurements of radial distances between the first distance sensor and an inner wall of the cavity, the first distance sensor being rotated by a certain angle after each measurement. On the other hand, the first distance sensor may also be set up for continuously performed measurements, which take place while the first distance sensor is rotating.

Particularly preferably, the measurement by means of the first distance sensor and the measurement by means of the second distance sensor take place simultaneously. Simultaneously performed measurements by means of the first distance sensor and the second distance sensor are in particular preferred irrespective of whether discrete or continuous measurements are performed with the first distance sensor. As a result of the simultaneity of the measurements, a time difference between the measurements is eliminated, and values for the radial distance between the first distance sensor and the inner wall of the cavity and for the axial distance between the second distance sensor and the reference object are obtained for one and the same point in time, whereby the measurements are more meaningful.

Furthermore, respective measurements with the first distance sensor are advantageously carried out for at least two different distances of the second distance sensor from the reference point. By analogy with the measurements with the first distance sensor, measurements with the second distance sensor can also be performed discretely or point by point. Thus, the distance of the second distance sensor from the reference object may be changed between each measurement, that is to say for example increased or reduced, or continuous distance measurements with respect to the reference object may be performed with the second distance sensor, measurements which take place during a continuous adjustment of the distance between the second distance sensor and the reference object. In this way, it is possible for example to produce spatial depth profiles of cavities.

The combination of the first distance sensor with the second distance sensor in the device according to the invention allows it to be used in particular for determining the position of the center axis of the cavity with reference to a prescribed axis or line. Particularly preferred therefore is an embodiment of the method according to the invention in which a reference laser beam is provided along a line extending through at least two cavities that are substantially in line with one another, the device is arranged successively in the two cavities in respective positions in which the reference laser beam falls onto the detection area of the second distance sensor, respective measurements are carried out with the first distance sensor in both cavities and, on the basis of these measurements, respective distances of the axis of rotation from the reference laser beam are determined and, on the basis of the distances determined, a relative position of the cavities in relation to one another or in relation to respective prescribed positions for the cavities is determined. Consequently, the alignment of cavities, such as for example bores, can be determined in an easy way.

The combination of the first distance sensor with the second distance sensor additionally allows further uses of the device according to the invention. Particularly preferred of these is a use for determining an alignment of at least one first roller, which is mounted rotatably about a first roller axis of rotation, with respect to at least one second roller, which is mounted rotatably about a second roller axis of rotation parallel to the first roller axis of rotation, the device being arranged at a position in which the main body assumes an orientation in which the axis of rotation of the first distance sensor is parallel with reference to a plane formed by the first roller axis of rotation and the second roller axis of rotation, at least one distance from an end face of the first roller being measured with the first distance sensor, the device being displaced along the axis of rotation and at least one distance from an end face of the second roller being measured with the first distance sensor.

BRIEF DESCRIPTION OF THE DRAWING FIGURES

The invention is explained in more detail below on the basis of preferred embodiments and with the aid of drawings, in which:

FIG. 1 shows a device for measuring cavities arranged in a cavity;

FIG. 2 shows a side view of a device for measuring cavities;

Figure 4A:
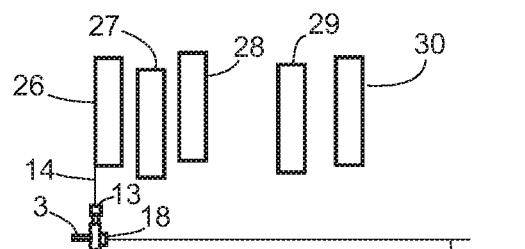

FIG. 3a) shows a cross section through two cavities, a device for measuring cavities being arranged in a first of the cavities;

FIG. 3b) shows the two cavities from FIG. 3a), the device being arranged in a second of the cavities; and FIGS. 4a)-4f) show a use of a device for measuring cavities for determining the alignment of a number of rollers.

DESCRIPTION OF THE INVENTION

In FIG. 1, an interior space or cavity 1 of a tubular body 2 with a circular cross section is represented. Arranged within the cavity 1 is a device 3 for measuring cavities. The device 3 can also be seen in FIG. 2, in side view without the body 2. Both FIGS. 1 and 2 are represented in a greatly simplified and schematic form for reasons of better overall clarity.

The device 3 also includes an elongated holder 4 with two ends 5 and 6 that are remote from one another. The holder 4 extending transversely through the cavity 1, and aligned vertically in FIGS. 1 and 2, bears with a first end 5 against an inner wall 7 of the cavity 1 at a lower location in FIG. 1, while the holder 4 bears 1 with a second end 6 at an upper location of the inner wall 7, lying diametrically opposite the lower location of the inner wall 7. Here, the length of the holder 4 is chosen such that the device 3 is securely clamped in the body 2 and is fixed within the cavity 1.

The device 3 also has a pin 8, which is mounted on the holder 4 and is rotatable about an axis of rotation 9. Arranged on the pin 8 is a cuboidal main body or housing 10, which moves with the pin 8 when it rotates. Between the holder 4 and the housing 10, a supporting bearing 11 for the pin 8 is provided on a surface of the holder 4.

An extendable arm 12 with, arranged on it, a first laser sensor 13, which is intended for emitting a laser beam 14, is arranged laterally on the housing 10. If the pin 8 or the housing 10 is rotated about the axis of rotation 9, the arm 12, and the first laser sensor 13 located at its end, also describe a circle about the axis of rotation 9. In this case, the laser beam 14 is emitted by the first laser sensor 13 in a direction that is perpendicular to the axis of rotation 9, and consequently radial. In FIGS. 1 and 2, the housing 10, the arm 12 and the first laser sensor 13 are represented in two different orientations. While in FIG. 1 the first laser sensor 13 emits the laser beam 14 in a horizontal direction to the left, the first laser sensor 13 can be seen after a rotation by 90° in the direction of the arrow depicted in FIG. 1 and then emits the laser beam 14 perpendicularly upwards. As is clear from FIG. 1, the laser beam 14 impinges on the inner wall 7 and is reflected back by it to the first laser sensor 13, where it is detected by a detector area of the first laser sensor 13 that is known per se and is not represented any more specifically.

Finally, a side of the housing 10 that is facing away from the holder 4 has a second laser sensor 15 and also an orientation means 16, which comprises a combination of an inclinometer and a gyroscope that is known per se and therefore not set out any more specifically and serves for determining the spatial orientation of the device 3. By contrast, the second laser sensor 15 has a laser beam source or laser source 17 and a detection area 18. As FIG. 2 reveals, the detection area 18 is arranged such that it is passed through by the axis of rotation 9. Furthermore, the detection area 18 is larger than the detection area (not shown) of the first laser sensor 13. The laser source 17 is intended for emitting a laser beam 19, which after reflection at a remote object, in the case of FIG. 2 a wall 20 or some other stable reference surface, is returned to the second laser sensor 15, impinges on the detection area 18 and is detected by it. Ideally, the laser beams 14 and 19 are oriented perpendicularly in relation to one another or they form an angle of substantially 90°.

Advantageously, the distance between the laser source 17 and the wall 20 is comparatively great and in practice is 1 m or more. Particularly suitable for this is a distance measurement on the basis of the transit-time method. Instead of laser sensors 13 and 15, which are based on the transit-time principle, in other embodiments it is however also possible for capacitive sensors, eddy-current sensors and sensors that are based on the confocal triangulation principle to be used.

For measuring the cavity 1, the device 3 is first arranged within the cavity 1 and fixed there, as represented in FIG. 1. In this case, the housing 10 assumes an orientation in which the axis of rotation 9 coincides substantially with a center axis of the cavity 1 for all rotating angles, to be precise independently of the angle of rotation by which the housing 10, and with it the first laser sensor 13, are rotated. Then, the housing 10 or the first laser sensor 13 is manually or automatically rotated about the axis of rotation 9, whereby the continuously emitted laser beam 14 runs along the inner wall 7 of the cavity 1, is reflected back by it to the first laser sensor 15 and is continuously detected by the first laser sensor 13 or by its detection area. Using for example the known transit-time method, the radial distance between the first laser sensor 14 and the inner wall 7 can be determined from the detected laser beam. In this way, the distance between the first laser sensor 13 and the inner wall 7 in a radial direction is measured continuously for a full rotation of the housing 10.

Simultaneously with the measurement of the radial distance, a measurement of the distance or the axial distance between the second laser sensor 15 and the wall 20 is performed in an analogous way, the laser beam 19 that is emitted by the second laser sensor 15 and reflected by the wall 20 being detected by the detection area 18 and the transit-time method being applied.

Since the device 9 can be easily positioned and measurements of the radial and axial distance can take place at the same time as one another or simultaneously, it is possible to carry out the measurement of the cavity 1 in a comparatively short time. Moreover, the actual process of performing or carrying out of the measurements, in particular for producing depth profiles of cavities 1, is found to be convenient, without additional measuring devices having to be provided outside the cavity 1 and laboriously adjusted. Because furthermore both the measurement of radial distances and the measurement of axial distances are carried out with the same device, the correlation between the measured values obtained is improved, which ultimately leads to a more exact and more reliable overall result.

The described device 3 is suitable in particular for measuring large cavities with diameters of over 400 mm and up to 3800 mm. The device 3 can however also be used for diameters up to 8 m, such as those which vertical hydro turbine generators have for example. Among the factors contributing to this is that the detection area 18 of the second laser sensor 15 is larger than the detection area (not shown) of the first laser sensor 13. Furthermore, depending on how great the diameter of the cavity to be measured is, the length of the extendable arm 12 can be adjusted correspondingly. Moreover, the overall weight of the device 3 is significantly reduced as a result of the simple design of the holder 4.

Apart from just measuring cavities 2, because of its large detection area 18, the device 3 is for example also suitable in particular for aligning cavities that are in line with one another, such as for example through-bores. In this respect, a first body 21 with a first through-bore 22 is shown in FIG. 3a). A second body 23 with a second through-bore 24 is arranged alongside the first body 21, the first through-bore 22 and the second through-bore 24 having substantially the same dimensions. As can be seen in FIG. 3a), although the first through-bore 22 and the second through-bore 24 are in line with one another, the first through-bore 22 and the second through-bore 24 are not aligned exactly in relation to one another, so that their center axes do not coincide exactly.

So, to determine the extent of the offset between the first through-bore 22 and the second through-bore 24, the device 3 is first arranged in one of the two through-bores 22 and 24. Without restricting the generality, FIG. 3a) shows the device 3 arranged in the first through-bore 22.

Then a reference laser beam 25 is radiated from an external laser source (not shown) along a line extending through the two through-bores 22 and 24. This line is generally the line on which the center axes of the through-bores 22 and 24 should lie when the through-bores 22 and 24 are aligned and their center axes are in line with one another. Since the second laser sensor 15 has a large detection area 18, the reference laser beam 25 impinges on the detection area 18 even when the center line of the first through-bore 22 that coincides with the axis of rotation 9 is offset with respect to this line, as in FIG. 3a).

The first through-bore 22 is measured in the way described above with the first laser sensor 13 and the second laser sensor 15. On the basis of this measurement, both the position or the offset of the axis of rotation 9, and consequently of the center axis of the first through-bore 22, in relation to the reference laser beam 25 and the distance of the first through-bore 22 or the first body 21 from a reference point or reference object, for example from the laser source generating the reference laser beam 25, can be determined.

Subsequently, the device 3 is arranged in the second through-bore 24, as can be seen in FIG. 3b). Here, too, the size of the detection area 18 is found to be advantageous, because it ensures impingement of the reference laser beam 25 on the detection area 18. The second through-bore 24 is then measured in the same way as the first through-bore 22, and both an offset of the axis of rotation 9 with reference to the reference laser beam 25 and the distance of the second through-bore 24 or of the second body 23 from the reference object is determined.

The deviations of the two through-bores 22 and 24 from the desired position are then known and the positions of the bodies 21 and 23 can be adjusted correspondingly, in order to align the through-bores 22 and 24 exactly with one another.

FIGS. 4a)-4f) show a further possibility for using the device 3, in which the device 3 is used for determining alignments of rotatable rollers or rolls, as are used for example in printing machines, but also of complete blocks or frames on which such rollers or rolls may be mounted.

In FIG. 4a), five rotatable rollers 26, 27, 28, 29 and 30 can be seen, the respective roller axes of rotation of which, which correspond to respective longitudinal axes of the rollers 26, 27, 28, 29 and 30, are parallel to one another. However, the rollers 26, 27, 28, 29 and 30, which are of the same length, are arranged offset with respect one another along their longitudinal axes. To be able to compensate for the respective offset of one of the rollers 26, 27, 28, 29 and 30, the magnitude of this offset with reference to a reference place must be known.

Although in the present example of FIG. 4a) the rollers 26, 27, 28, 29 and 30 are of the same length, this does not necessarily have to be the case. Rather, the alignment in relation to another of the rollers of different lengths can also be determined. For example, rollers of different lengths can be centrally aligned by determining a respective offset of respective center lines of the rollers oriented perpendicularly to the respective longitudinal axes with respect to a prescribed reference line in a way corresponding to the method described below.

Figure 4B:
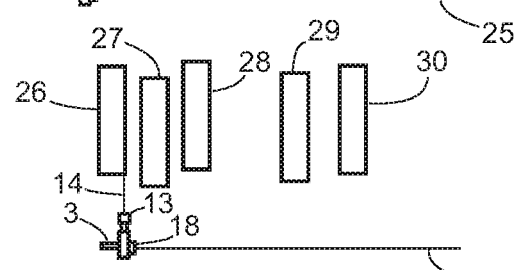

For determining the offset, a reference laser beam 25 is emitted, as shown in FIG. 4a), from a laser source (not shown), extending in FIGS. 4a)-f) under end faces of the rollers 26, 27, 28, 29 and 30 and extending in or at least parallel to a plane formed by the roller axes of rotation. Then, the device 3 is arranged in such a way that the reference laser beam 25 impinges on the detection area 18 and the laser beam 14 emitted by the first laser sensor 13 impinges as far as possible in the peripheral region of an end face of the roller 26. In the case of this arrangement of the device 3, the axis of rotation 9 also extends in or at least parallel to the plane formed by the roller axes of rotation. Once the distance from the end face of the roller 26 has been measured with the first laser sensor 13, the device 3 is moved along the reference laser beam 25, so that the laser beam 14 emitted by the first laser sensor 13 then impinges at an opposite location of the peripheral region of the end face of the roller 26, as shown in FIG. 4b). In this position of the device 3, the measurement of the radial distance is carried out once again. The distances of the end face of the roller 26 obtained by the two measurements can be used to determine not only the distance of the roller from the reference laser beam 25 but also its inclination in relation to a line perpendicular to the reference laser beam 25.

Figure 4C:
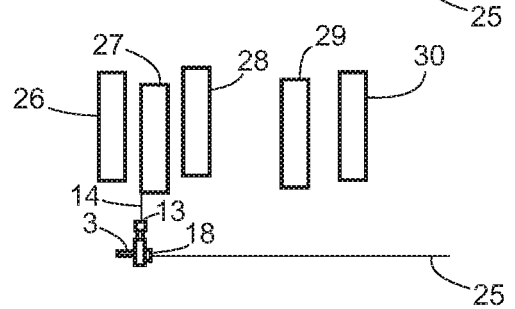
Figure 4D:
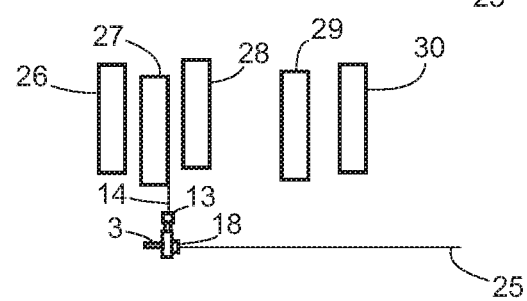
Figure 4E:
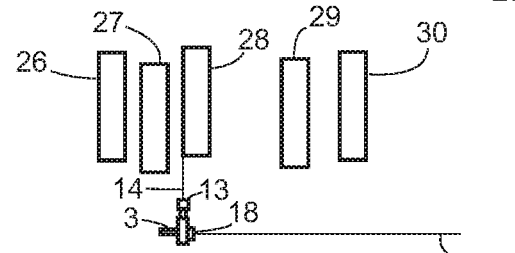
Figure 4F:
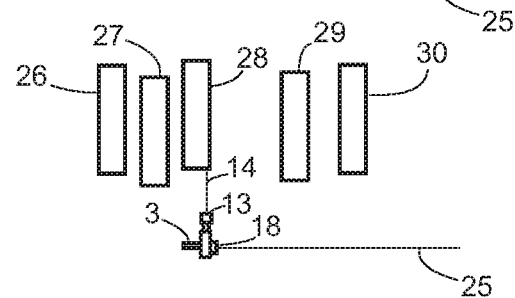

The described procedure is repeated for the other rollers 27, 28, 29 and 30, which is shown in FIGS. 4c) and 4d) by way of example for the roller 27 and in FIGS. 4e) and 4f) for the roller 28.

By means of the data thus obtained, the positions of the rollers 26, 27, 28, 29 and 30 can then be corrected and the rollers 26, 27, 28, 29 and 30 can be aligned exactly in relation to one another.

It would be appreciated by those skilled in the art that various changes and modifications can be made to the illustrated embodiments without departing from the spirit of the present invention. All such modifications and changes are intended to be covered by the appended claims.

What is claimed is:

1. A device for measuring cavities, comprising:
   a main body;
   at least one first distance sensor mounted on the main body and rotatable about an axis of rotation for contactlessly measuring distances in a radial direction with respect to the axis of rotation;
   a holder for fixing the device within the cavity in a position in which the main body has an orientation in which the axis of rotation of the first distance sensor coincides substantially with a center axis of the cavity; and
   at least one second distance sensor, arranged on the main body, configured to contactlessly measure distances in a direction parallel to the axis of rotation, the axis of rotation passing through a detection area of the second distance sensor,
   wherein the device is configured and arranged for determining an alignment of at least one first roller, which is mounted rotatably about a first roller axis of rotation, with respect to at least one second roller, which is mounted rotatably about a second roller axis of rotation parallel to the first roller axis of rotation;

the device being configured and arranged at a position in which the main body assumes an orientation in which the axis of rotation of the first distance sensor is parallel with reference to a plane formed by the first roller axis of rotation and the second roller axis of rotation;

the first distance sensor being configured and arranged to measure at least one distance from an end face of the first roller;

the device being displaced along the axis of rotation; and the first distance sensor being configured and arranged to measure at least one distance from an end face of the second roller.

2. The device according to claim 1, wherein the first distance sensor is rotatable by a full circle, the radius of which is variably adjustable.

3. The device according to claim 1, wherein the first distance sensor and/or the second distance sensor is a laser sensor with at least one laser source for emitting a laser beam and at least one detection area for detecting reflected laser beams.

4. The device according to claim 3, wherein both the first distance sensor and the second distance sensor is a laser sensor and the detection area of the second distance sensor is larger than that of the first distance sensor.

5. The device according to claim 1, wherein the holder is elongated with two opposite ends, both of which are bear against an inner wall of the cavity.

6. A device for measuring cavities, comprising:

a main body;

at least one first distance sensor mounted on the main body and rotatable about an axis of rotation for contactlessly measuring distances in a radial direction with respect to the axis of rotation;

a holder for fixing the device within the cavity in a position in which the main body has an orientation in which the axis of rotation of the first distance sensor coincides substantially with a center axis of the cavity; and at least one second distance sensor, arranged on the main body, configured to contactlessly measure distances in a direction parallel to the axis of rotation, the axis of rotation passing through a detection area of the second distance sensor, wherein the device is configured and arranged within the cavity and fixed by the holder in a position where the main body is oriented with the axis of rotation of the first distance sensor coinciding substantially with a center axis of the cavity;

the first distance sensor is configured and arranged to be rotated about the axis of rotation and at least one distance from an inner wall of the cavity in a radial direction with respect to the axis of rotation is configured and arranged to be contactlessly measured with the first distance sensor; and the second distance sensor is configured and arranged to measure a distance in a direction parallel to the axis of rotation, wherein a reference laser beam is provided along a line extending through at least two cavities that are substantially in line with one another; the device is configured and arranged successively in the two cavities in respective positions in which the reference laser beam falls onto the detection area of the second distance sensor;

whereby respective measurements are carried out with the first distance sensor in both cavities and, on the basis of these measurements, respective distances of the axis of rotation from the reference laser beam are determined and, on the basis of the distances determined, a relative position of the cavities in relation to one another or in relation to respective prescribed positions for the cavities is determined.

7. The device according to claim 6, wherein the first distance sensor is rotatable by a full circle, the radius of which is variably adjustable.

8. The device according to claim 6, wherein the first distance sensor and/or the second distance sensor is a laser sensor with at least one laser source for emitting a laser beam and at least one detection area for detecting reflected laser beams.

9. The device according to claim 8, wherein both the first distance sensor and the second distance sensor is a laser sensor and the detection area of the second distance sensor is larger than that of the first distance sensor.

10. The device according to claim 6, wherein the holder is elongated with two opposite ends, both of which are bear against an inner wall of the cavity.

11. The device according to claim 6, further comprising: at least one inclinometer and/or at least one gyroscope.

12. The device according to claim 6, wherein the measurement by the first distance sensor and the measurement by the second distance sensor are configured to take place simultaneously.

13. The device according to claim 6, wherein respective measurements with the first distance sensor are configured to be carried out for at least two different distances of the second distance sensor from a reference point.

* * * * *